United States Patent [19]

Martin et al.

[11] Patent Number: 4,891,420

[45] Date of Patent: Jan. 2, 1990

[54] CONTINUOUS PROCESS FOR THE HYDROLYTIC PRODUCTION OF POLYCAPROLACTAM BY TEMPERING UNEXTRACTED GRANULAR POLYMER MATERIAL WITH MOIST INERT GAS

[75] Inventors: Wolfgang K. Martin, Williamsburg, Va.; James R. Ryffel, Lake Jackson, Tex.; Hans H. Schuster, Erpolzheim, Fed. Rep. of Germany; Chih-Peng Wen, Lake Jackson, Tex.

[73] Assignee: BASF Aktiengesellschaft, Ludwigshafen, Fed. Rep. of Germany

[21] Appl. No.: 213,776

[22] Filed: Jun. 30, 1988

[51] Int. Cl.$^4$ ............................................. C08G 69/16
[52] U.S. Cl. .................................... 528/315; 528/323; 528/480; 528/481; 528/483

[58] Field of Search ............... 528/315, 323, 480, 481, 528/483

[56] References Cited

U.S. PATENT DOCUMENTS

| | | | |
|---|---|---|---|
| 3,476,711 | 11/1969 | Muller et al. | 528/315 |
| 3,632,558 | 1/1972 | Siclari et al. | 528/315 |
| 3,644,298 | 2/1972 | Gerlach et al. | 528/315 |
| 3,715,340 | 2/1973 | Finestone et al. | 528/315 |
| 4,366,306 | 12/1982 | Smith | 528/315 |
| 4,574,054 | 3/1986 | Ciaperoni et al. | 528/315 |

Primary Examiner—Harold D. Anderson
Attorney, Agent, or Firm—William G. Conger

[57] ABSTRACT

A process for tempering unextracted polycaprolactam is disclosed which results in polycaprolactam having suitable physical and chemical properties for melt extrusion and spinning, without the need for conventional solvent/water extraction and drying of crude granules.

11 Claims, 1 Drawing Sheet

CONTINUOUS PROCESS FOR THE HYDROLYTIC PRODUCTION OF POLYCAPROLACTAM BY TEMPERING UNEXTRACTED GRANULAR POLYMER MATERIAL WITH MOIST INERT GAS

BACKGROUND OF THE INVENTION

1. Field of the Invention

The subject invention relates to the manufacture of polycaprolactam. More particularly, the subject invention relates to a process for increasing the molecular weight and simultaneously removing unreacted monomer and oligomers from the unextracted polycaprolactam by treatment with hot inert gas having a specific moisture content. This treatment is herein referred to as "tempering". The tempered polycaprolactam granules, when prepared by the process of the invention, are suitable for further melt processing, e.g. in spinning carpet yarns.

2. Description of the Related Art

Polycaprolactam is produced by the polymerization of caprolactams, principally, $\epsilon$-caprolactam, optionally in the presence of other amide-linkage-producing monomers. While a number of polymerization initiators may be utilized, water still remains the initiator of choice. The presence of small quantities of water in the $\epsilon$-caprolactam monomer causes hydrolysis of a portion of the $\epsilon$-caprolactam to $\epsilon$-aminocaproic acid, which then initiates the ring opening polymerization resulting in the formation of polycaprolactam.

The polymerization reaction eventually reaches a steady state equilibrium in which the product contains significant amounts of water, $\epsilon$-caprolactam monomer, caprolactam-derived oligomers, and polymer. When high molecular weight products are desired, the polycaprolactam prepared as described, is extracted with organic solvents and/or water to remove unreacted monomer and oligomers, followed by drying in hot inert gas or under vacuum. Alternatively, monomer and some oligomers can be removed by vacuum demonomerization of the melt.

When lower molecular weight products suitable for melt-spinning of fibers are desired, chain regulators are often added to the reaction mixture to limit the molecular weight to lower values. Suitable chain regulators are monoamines or diamines, preferably the former, and mono and dicarboxylic acids, again with preference being given to monofunctional chain regulators. The chain regulated polymers also are washed with organic solvent and/or water to remove extractable components and then dried, or melt vacuum demonomerized.

U.S. Pat. No. 3,155,637 discloses a process for removing extractables and simultaneously increasing the molecular weight of polycaprolactam which has been prepared in the absence of chain regulators, by subjecting the unextracted granules to treatment with superheated steam, optionally containing an inert gas such as nitrogen or carbon dioxide. When chain regulated polycaprolactam is tempered by this process, however, the product produced does not have the dyeability characteristics nor the stable high temperature resin viscosity required for spinning fibers suitable for carpet and other yarn applications. Moreover, at high moisture levels, hydrolysis of polycaprolactam into monomer and oligomers occurs and resin viscosity may decrease rather than increase.

SUMMARY OF THE INVENTION

It has now been unexpectedly discovered that chain regulated polycaprolactam can be successfully tempered provided that specific chain regulators are used in its preparation, and provided that the moisture content of the tempering gas remains between about 2 and 15 weight percent. The product produced by this process retains the dyeability characteristics associated with polycaprolactam produced conventionally by extracting monomers and oligomers with organic solvents and/or water followed by drying. Such fibers accept conventional polycaprolactam dyes to about the same degree as conventional polycaprolactam, in an even manner without substantial undyed segments. In addition, the polycaprolactam so prepared shows little change in resin viscosity at elevated temperatures as occur in the extrusion process, for example, a change in viscosity not substantially different from that of conventionally processed resins.

BRIEF DESCRIPTION OF THE DRAWING

The drawing discloses a continuous process for tempering polycaprolactam according to the process of the subject invention.

DESCRIPTION OF THE PREFERRED EMBODIMENTS

Figure 1:
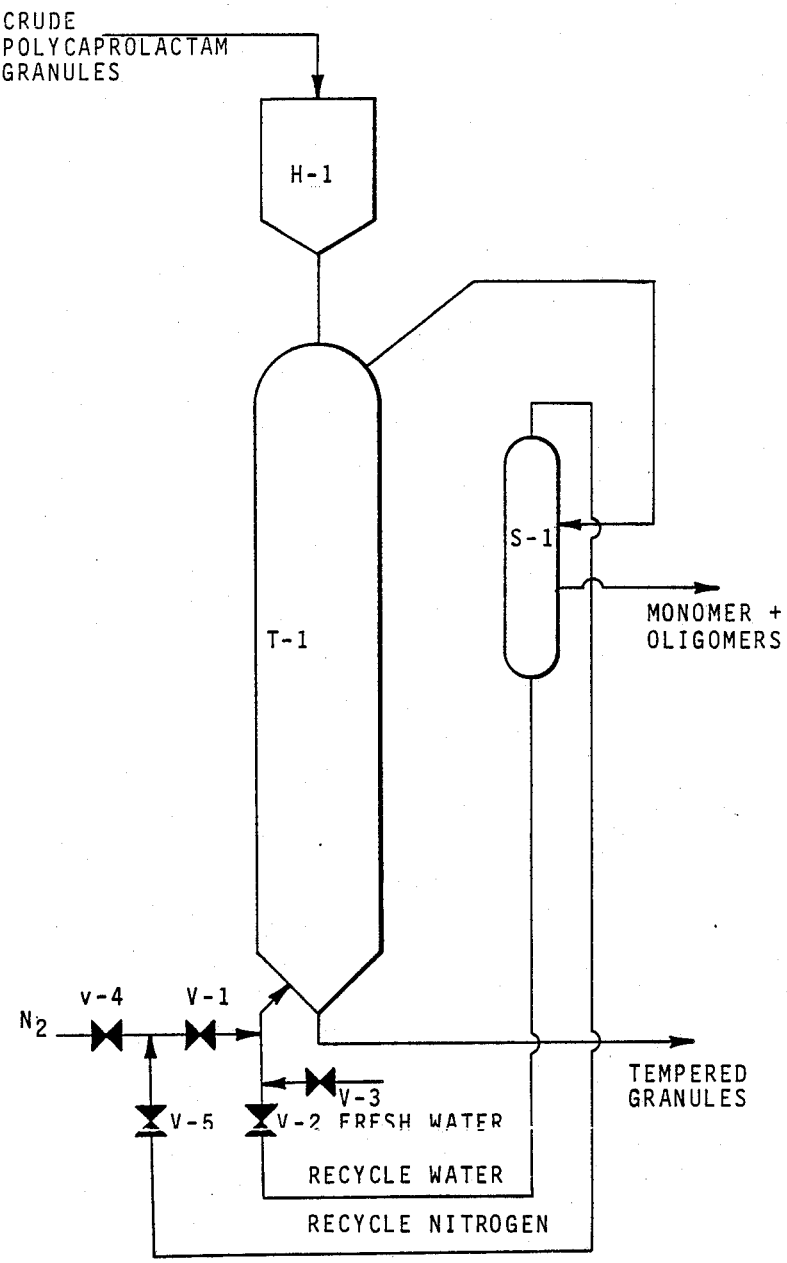

The polycaprolactams useful in the process of the subject invention are otherwise conventional polycaprolactams prepared using the chain regulators described hereinafter. The finished products have relative viscosities of about 2.0 or greater, when measured at a concentration of 1.0 g polycaprolactam in 100 ml 96 percent $H_2SO_4$ at 25° C., and preferably have relative viscosities of from about 2.2 to about 3.5. Such polycaprolactams are generally prepared by polymerizing $\epsilon$-caprolactam, which may optionally contain other polymerizable monomers such as lactams with larger or smaller ring sizes, or with diamines or dioic acids such as hexamethylenediamine or hexanedioic acid. Preferably, the polymerizable monomer is substantially $\epsilon$-caprolactam. Polymerization conditions are conventional, and well known to those skilled in the art of polycaprolactam production.

The chain regulators useful in the process of the subject invention are the alkylammonium carboxylates, preferably butylammonium acetate, and mixtures of hexamethylenediamine and monocarboxylic acids, preferably a mixture of hexamethylenediamine and propionic acid. The chain regulators are utilized in an amount necessary to provide the product with the molecular weight range, as reflected by the resin's relative viscosity, which is suitable for the particular application.

The alkyl portion of the alkylammonium carboxylates may contain from 2 to about 14 carbon atoms, preferably from 4 to 8 carbon atoms. Most preferably, the alkyl portion is a butyl group. The carboxylate group may be derived from an organic carboxylic acid containing from 2 to about 10 carbon atoms, preferably from 2 to 3 carbon atoms. Most preferably, the carboxylate group is an acetate group. The monocarboxylic acid of the hexamethylenediamine/carboxylic acid chain regulator mixture is a 2 to 10 carbon carboxylic acid, preferably a 2 to 3 carbon carboxylic acid, and most preferably, propionic acid.

Preferably, the alkylammonium carboxylate chain regulators are utilized in an amount of about 0.3 to about 0.6, more preferably from about 0.35 to about 0.5 and most preferably about 0.45 weight percent relative to the total monomer charge.

The hexamethylenediamine/monocarboxylic acid mixtures may contain mole ratios of diamine to acid of from about 0.5 to about 1.1, preferably from about 0.55 to about 0.8, and most preferably about 0.6. The amount of the hexamethylenediamine component is from about 0.04 to about 0.5, and most preferably about 0.19 weight percent relative to the total monomer charge.

The polycaprolactam product prepared thusly generally contains in excess of 5.0 weight percent extractables, typically 10–13 weight percent. This product is generally extruded and the extrudate chopped into small granules. Alternatively, other methods may be used to form relatively small particles, or "chips" of polymer. As used herein and in the claims, the term "granule" shall be taken to mean all these particulate forms of polymer. This granule is then tempered with a hot inert gas such as nitrogen, argon, or carbon dioxide which contains from 2 to about 15 weight percent water vapor, preferably from about 6 to about 10 weight percent water vapor. Tempering is conducted at a temperature of from 130° C. to about 200° C., more preferably from about 140° C. to about 180° C., and most preferably from about 150° C. to about 180° C., for a period of from 8 to about 100 hours, preferably from about 10 to about 64 hours, and most preferably from about 16 to about 40 hours.

Following tempering, the resin's relative viscosity shows an increase of generally from about 0.2 to about 2.0, more particularly from about 0.4 to about 1.5 over its pretempered value. At the same time, the extractables generally decrease from about 10–13 weight percent to about 0–3 weight percent, more particularly 0.3 to about 2.0 weight percent, and preferably less than about 0.7 percent.

Although the subject invention may be performed in a batch-type process, it preferably is performed in a continuous mode. In such a continuous process, newly prepared polycaprolactam chips or granules may be added, for example, to the top of a tempering tower. A stream of inert gas containing the appropriate amount of water is fed to the bottom of the tower. Preferably, the moisture content of the gas is fixed through metering the appropriate amount of water into the gas flow. Particular care should be taken to exclude oxygen.

The desired residence time is achieved through adjustment of the polycaprolactam feed and take-off rates. During tempering, inert gas flow should be maintained at a value high enough to prevent tower fouling problems and supply sufficient energy to achieve the desired tempering temperature. Preferably, the gas flow rate is at least about 0.1 m/sec. Monomer and oligomers from the tempering gas stream are preferably recovered. The process may be illustrated by reference to the drawing and to the examples which follow. Other methods of accomplishing the desired results will readily suggest themselves to the skilled engineer, and thus the drawing should be considered as illustrative only.

In the drawing, polycaprolactam prepared using the chain regulators of the subject invention and containing roughly 10 percent extractables is extruded, chopped into granules, and fed into feed hopper H-1. The granules are fed from hopper H-1 into tempering tower T-1 which is maintained at a temperature of approximately 160°–180° C. Hot inert gas, preferably nitrogen, is fed into the bottom of the tower through valve V-1. To the nitrogen input stream is injected water through valve V-2 sufficient to produce an input gas stream containing from about 6–10 weight percent water. Tempered polycaprolactam is removed from the bottom of the tempering tower T-1 and stored for future use or routed directly to an extruder for further processing.

Oligomers and unreacted monomer as well as water in excess of the equilibrium concentration are removed from the top of tempering tower T-1 and routed to separator S-1 From the separator, inert gas is recycled to the inert gas input, water is recycled to the water input, and monomer and oligomers are recovered. The recycle streams' volumes are adjusted by valves V-2 and V-5. Additional nitrogen and fresh water may be supplied through valves V-4 and V-3, respectively.

The separator S-1 is used to separate nitrogen from monomer, oligomers and water. It may be, for example, a simple distillation tower operated at a temperature lower than that of the T-1 exit gas stream. Alternatively, it may be a scrubber containing a water/caprolactam mixture as the scrubbing medium, or a combination of scrubbing and distillation units. Preferably, virtually all the inert gas, water, and monomer/oligomer are recovered.

EXAMPLE 1 (COMPARATIVE)

ε-Caprolactam monomer was polymerized into polycaprolactam using conventional polymerization conditions of about 16 hours and approximately 260° C. with 0.4 weight percent water as the reaction initiator and 0.28 weight percent propionic acid as the chain regulator. The resulting polymer was extruded, granulated and tempered. The properties of the polymers are presented in Table I. The data clearly indicate the benefit of higher viscosity achieved with water in the tempering nitrogen.

EXAMPLE 2

The process of Example 1 was followed, but the chain regulator was a mixture consisting of 0.19 weight percent hexamethylenediamine and 0.20 weight percent propionic acid. The properties of the polymer are presented in Table I.

EXAMPLE 3

The process of Example 1 was followed, but the chain regulator was replaced by 0.44 weight percent of butylammonium acetate. The properties of the polymer are presented in Table I.

TABLE I

| Polycaprolactam From Example | Properties Before Tempering[1] | | Properties After Tempering | | |
|---|---|---|---|---|---|
| | % Extractables | RV | % Extractables | RV | Dyeability |
| 1 (Comparative)[2] | 12.0 | 2.26 | 1.52 | 2.60 | deficient |
| 1 (Comparative) | 12.0 | 2.26 | 1.46 | 2.72 | deficient |
| 2 | 10.6 | 2.54 | 1.43 | 2.84 | good |

TABLE I-continued

| Polycaprolactam From | Properties Before Tempering[1] | | Properties After Tempering | | |
|---|---|---|---|---|---|
| Example | % Extractables | RV | % Extractables | RV | Dyeability |
| 3 | 10.9 | 2.16 | 1.6 | 2.41 | good |

[1]Tempering with 9-10 weight percent water in $N_2$ at 175° C. for 40 hours.
RV = relative viscosity.
[2]Part of the polycaprolactam polymerized in Example 1 was tempered with dry $N_2$ at 175° C. for 40 hours.

In Table II, the stabilities of the melt viscosity and the amino end groups (AEG) of conventional polycaprolactam and the polycaprolactams of the subject invention are compared. In each case, the polycaprolactams are prepared as in Examples 1-3.

TABLE II

| Poly-capro-lactam | Chain Regulator | Original | | After Melt Test[1] | | Δ (RV) | Δ (AEG) |
|---|---|---|---|---|---|---|---|
| | | RV | AEG | RV | AEG | | |
| 4 | Conventional[2] | 2.71 | 36.1 | 2.88 | 33.5 | 0.17 | −2.6 |
| 5 | HMDA/PA[3] | 2.84 | 35.2 | 3.02 | 33.9 | 0.18 | −1.3 |
| 6 | Conventional[2] | 2.42 | 28.5 | 2.56 | 24.4 | 0.14 | −4.1 |
| 7 | BAA[4] | 2.46 | 27.0 | 2.53 | 27.0 | 0.07 | 0 |
| 8 | Conventional[2] | 2.67 | — | 2.67 | — | 0 | — |
| 9 | Conventional[5] | 3.95 | — | 3.53 | — | −0.42 | — |

[1]260° C. for 15 minutes under nitrogen.
[2]Polycaprolactams 4, 6, and 8 are completely conventional including normal water extraction and drying.
[3]Hexamethylenediamine/propionic acid as in Example 2.
[4]Butylammonium acetate as in Example 3.
[5]Identical to Polycaprolactam 8 but tempered at 170° C. for 64 hours in $N_2$ containing 6 weight percent $H_2O$. Melt stability of Polycaprolactams 8 and 9 measured after actual spinning.

Table II indicates that the products utilizing the process of the subject invention, Polycaprolactams 5 and 7, are comparable to conventional, untempered polycaprolactams having similar molecular weights. Polycaprolactams 5 and 7 are actually superior with respect to the change in amino end groups and consequently should produce fiber of more stable and uniform dyeability. Polycaprolactam 7, using the most preferred butylammonium acetate chain regulator, possessed distinct advantages over the conventional Polycaprolactam 6 with regard to the stabilities in both melt viscosity and amino end groups. Tempered Polycaprolactam 9, having a conventional chain regulator, possessed a much higher resin viscosity than its untempered analogue Polycaprolactam 8. However, the conventional chain regulator caused a very large reduction in resin viscosity under extrusion conditions and in addition showed poor dyeability.

The embodiments of the invention in which an exclusive privilege or property is claimed are defined as follows:

1. In a process for the hydrolytic polymerization of caprolactam into polycaprolactam in the presence of a chain regulator, the improvement comprising:
   (a) employing, during said polymerization, a chain regulator selected from the group consisting of
      (i) alkylammonium carboxylates and
      (ii) hexamethylenediamine/monocarboxylic acid mixtures wherein the mole ratio of hexamethylenediamine to monocarboxylic acid is from about 0.5:1 to about 1.1:1, to form crude polycaprolactam;
   (b) preparing granules from the crude, unextracted polycaprolactam thus produced; and
   (c) tempering said granules at a temperature of from about 130° C. to about 200° C. for a period of from 8 to about 100 hours in a stream of inert gas containing from 2 to about 15 weight percent water; whereby the granules thus tempered exhibit a higher polymer relative viscosity and lower extractables content than the crude unextracted granules while maintaining stable relative viscosity, amino end groups, and dyeability under extrusion conditions.

2. The process of claim 1 wherein said alkylammonium carboxylate is butylammonium acetate and said hexamethylenediamine/monocarboxylic acid mixture is a hexamethylenediamine/propionic acid mixture.

3. The process of claim 2 wherein said tempering is conducted at a temperature of from about 140° C. to about 180° C. for a period of from 16 to about 64 hours.

4. The process of claim 3 wherein said inert gas is nitrogen.

5. The process of claim 2 wherein said butylammonium acetate is present in an amount of from 0.3 to about 0.6 weight percent relative to the total monomer charge, wherein said mixture is present in an amount of from about 0.04 to about 0.5 weight percent hexamethylenediamine based upon the total monomer charge.

6. The process of claim 1 wherein said inert gas contains from 4 to about 10 weight percent water.

7. The process of claim 2 wherein said inert gas contains from 4 to about 10 weight percent water.

8. The process of claim 1 wherein said inert gas contains from 6 to about 10 weight percent water.

9. The process of claim 2 wherein said inert gas contains from 6 to about 10 weight percent water.

10. The process of claim 4 wherein said inert gas contains from 6 to about 10 weight percent water.

11. The process of claim 5 wherein said inert gas contains from 6 to about 10 weight percent water.

* * * * *

UNITED STATES PATENT AND TRADEMARK OFFICE
CERTIFICATE OF CORRECTION

PATENT NO. : 4,891,420
DATED : January 2, 1990
INVENTOR(S) : Martin et al.

It is certified that error appears in the above-identified patent and that said Letters Patent is hereby corrected as shown below:

At column 6, line 43, please insert —-The process of claim 2-- after the period (.) and before "wherein".

Signed and Sealed this

Eighth Day of March, 1994

Attest:

BRUCE LEHMAN

*Attesting Officer*     *Commissioner of Patents and Trademarks*